United States Patent
Li

(10) Patent No.: US 9,081,127 B2
(45) Date of Patent: Jul. 14, 2015

(54) POSITIONING STRUCTURE FOR LIGHT-GUIDING PLATE AND BACK FRAME, BACKLIGHT MODULE AND LIQUID CRYSTAL DISPLAY DEVICE THEREOF

(71) Applicant: Shenzhen China Star Optoelectronics Technology Co., Ltd., Shenzhen, Guangdong (CN)

(72) Inventor: Quan Li, Shenzhen (CN)

(73) Assignee: Shenzhen China Star Optoelectronics Technology Co., Ltd, Shenzhen, Guangdong (CN)

(*) Notice: Subject to any disclaimer, the term of this patent is extended or adjusted under 35 U.S.C. 154(b) by 369 days.

(21) Appl. No.: 13/813,158

(22) PCT Filed: Jan. 10, 2013

(86) PCT No.: PCT/CN2013/070338
§ 371 (c)(1),
(2) Date: Jan. 29, 2013

(87) PCT Pub. No.: WO2014/106354
PCT Pub. Date: Jul. 10, 2014

(65) Prior Publication Data
US 2014/0192292 A1    Jul. 10, 2014

(30) Foreign Application Priority Data
Jan. 6, 2013 (CN) .......................... 2013 1 0003737

(51) Int. Cl.
*G02F 1/1335* (2006.01)
*F21V 8/00* (2006.01)

(52) U.S. Cl.
CPC .................................. *G02B 6/0088* (2013.01)

(58) Field of Classification Search
CPC ....................................................... G02B 6/0088
USPC ............................................................ 349/65
See application file for complete search history.

(56) References Cited

U.S. PATENT DOCUMENTS

| | | | |
|---|---|---|---|
| 2011/0255303 A1* | 10/2011 | Nichol et al. | 362/606 |
| 2013/0155723 A1* | 6/2013 | Coleman | 362/621 |
| 2014/0118911 A1* | 5/2014 | Tang et al. | 361/679.01 |
| 2014/0192288 A1* | 7/2014 | Li | 349/58 |

FOREIGN PATENT DOCUMENTS

CN    201247354Y  Y    5/2009

* cited by examiner

Primary Examiner — Timothy L Rude
(74) Attorney, Agent, or Firm — Andrew C. Cheng

(57) ABSTRACT

The present invention provides a positioning structure for light-guiding plate (LGP) and back frame, backlight module and liquid crystal display device thereof, wherein LGP disposed inside the back frame, first side inner wall of back frame disposed with a plurality of LEDs, second side inner wall adjacent to first side inner wall disposed with first magnetic body, a side of LGP corresponding to second side inner wall disposed with attachment body; first magnetic body and attachment body correspondingly attached, third side inner wall of back frame opposite to second side inner wall disposed with buffer plate, fourth side inner wall of back frame disposed with second magnetic body, a side of LGP corresponding to fourth side inner wall disposed with attachment body; second magnetic body and attachment body correspondingly attached. As such, back frame and LGP are firmly positioned and fixed to improve assembly yield arte.

18 Claims, 2 Drawing Sheets

POSITIONING STRUCTURE FOR LIGHT-GUIDING PLATE AND BACK FRAME, BACKLIGHT MODULE AND LIQUID CRYSTAL DISPLAY DEVICE THEREOF

BACKGROUND OF THE INVENTION

1. Field of the Invention

The present invention relates to the field of liquid crystal displaying techniques, and in particular to a positioning structure for light-guiding plate (LGP) and back frame, backlight module and liquid crystal display device thereof.

2. The Related Arts

Due to the many advantages, the liquid crystal display devices (LCD) find wide applications in the field of electronic devices.

When using LED as a backlight source in LCD, the light-guiding plate (LGP) of the backlight module is an important optical component. The LGP can transform the linear light source into a planar light source. The main material for LGP is polymethylmethacrylate (PMMA), often called optical acrylic. The transparent acrylic has a high transmittance, but also has shows the characteristics of higher index of thermal expansion or shrinking. As a result, the LGP has a lower anti-impact capability. In addition, during LCD displaying, the precision of the positioning of the LGP has a greater impact on the utilization efficiency for light emitted by the backlight source LED.

SUMMARY OF THE INVENTION

The present invention provides a positioning structure for light-guiding plate (LGP) and back frame; the LGP being disposed inside the back frame, and a first side inner wall of the back frame being disposed with a plurality of LEDs, a second side inner wall adjacent to the first side inner wall being disposed with at least a first magnetic body, a side of the LGP corresponding to the second side inner wall being disposed with an attachment body corresponding to the first magnetic body; the first magnetic body and the attachment body being correspondingly attached, a third side inner wall of the back frame opposite to the second side inner wall being disposed with at least a buffer plate, a fourth side inner wall of the back frame opposite to the first side inner wall being disposed with at least a second magnetic body, a side of the LGP corresponding to the fourth side inner wall being disposed with an attachment body corresponding to the second magnetic body; the second magnetic body and the attachment body being correspondingly attached.

The present invention also provides a backlight module, which comprises a mold frame, at least an optical film, and a positioning structure for light-guiding plate (LGP) and back frame; wherein in the positioning structure for the LGP and the back frame, the LGP being disposed inside the back frame, and a first side inner wall of the back frame being disposed with a plurality of LEDs, a second side inner wall adjacent to the first side inner wall being disposed with at least a first magnetic body, a side of the LGP corresponding to the second side inner wall being disposed with an attachment body corresponding to the first magnetic body; the first magnetic body and the attachment body being correspondingly attached, a third side inner wall of the back frame opposite to the second side inner wall being disposed with at least a buffer plate, a fourth side inner wall of the back frame opposite to the first side inner wall being disposed with at least a second magnetic body, a side of the LGP corresponding to the fourth side inner wall being disposed with an attachment body corresponding to the second magnetic body; the second magnetic body and the attachment body being correspondingly attached.

The present invention further provides a liquid crystal display device, which comprises a backlight module, a display screen and an outer frame, the backlight module further comprising a mold frame, at least an optical film, and a positioning structure for light-guiding plate (LGP) and back frame; the optical film being disposed on the LGP and being fixed by the mold frame, the display screen being disposed on the mold frame and being fixed by the outer frame; wherein in the positioning structure for the LGP and the back frame, the LGP being disposed inside the back frame, and a first side inner wall of the back frame being disposed with a plurality of LEDs, a second side inner wall adjacent to the first side inner wall being disposed with at least a first magnetic body, a side of the LGP corresponding to the second side inner wall being disposed with an attachment body corresponding to the first magnetic body; the first magnetic body and the attachment body being correspondingly attached, a third side inner wall of the back frame opposite to the second side inner wall being disposed with at least a buffer plate, a fourth side inner wall of the back frame opposite to the first side inner wall being disposed with at least a second magnetic body, a side of the LGP corresponding to the fourth side inner wall being disposed with an attachment body corresponding to the second magnetic body; the second magnetic body and the attachment body being correspondingly attached.

According to a preferred embodiment of the present invention, attachment body is a magnetic metal plate.

According to a preferred embodiment of the present invention, the first magnetic body and the second magnetic body are both magnets.

According to a preferred embodiment of the present invention, the attachment body is adhered to the side of the LGP by an adhesive, and the adhesive is acrylic glue.

According to a preferred embodiment of the present invention, a surface of the attachment body contacting the adhesive is disposed with a reflective film layer.

According to a preferred embodiment of the present invention, the reflective film layer is a silver reflective film layer.

According to the present invention, the positioning structure of the LGP and back frame, the backlight module and the LCD of the present invention can firmly fix the LGP inside the back frame so as to improve the anti-impact capability of the LGP.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

For description of the technical means and result of the present invention, the following refers to the drawings and embodiments for detailed description, wherein the same number indicates the same part.

Figure 1:
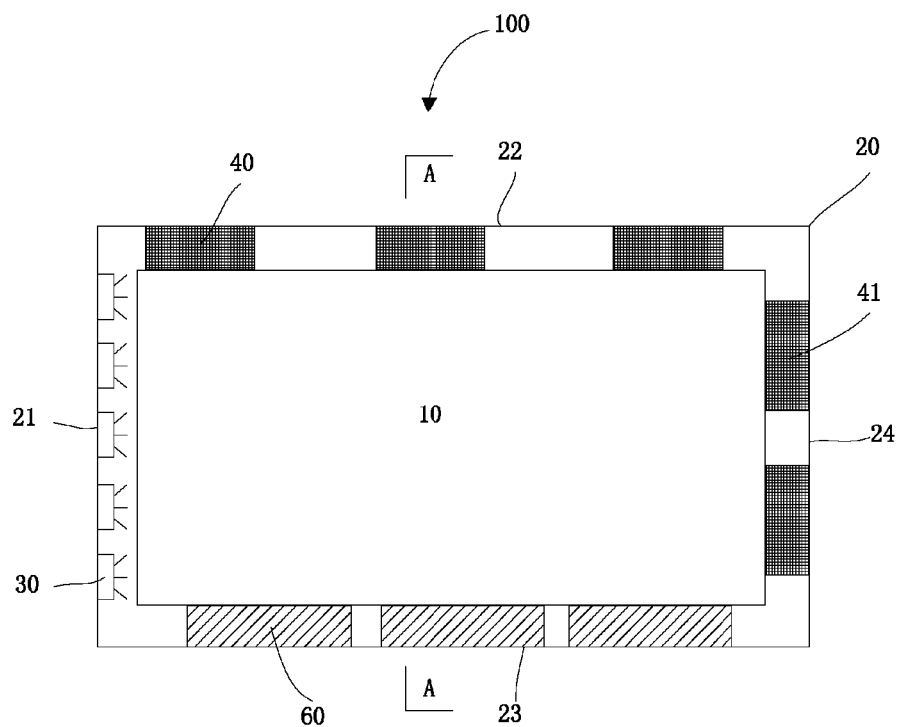
FIG. 1 is a schematic view showing the structure of a positioning structure for light-guiding plate and back frame according to the present invention.
Figure 2:
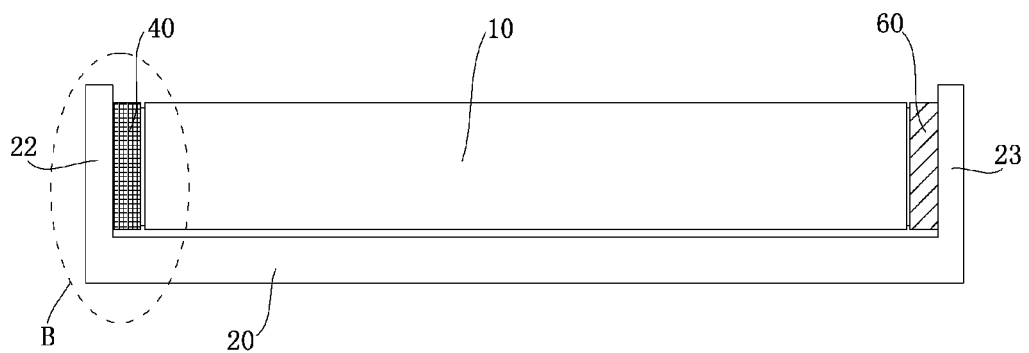
FIG. 2 is a cross-sectional view along the A-A line shown in FIG. 1.

FIG. 1 is a schematic view showing the structure of a positioning structure for light-guiding plate and back frame according to the present invention; FIG. 2 is a cross-sectional view along the A-A line shown in FIG. 1; and FIG. 3 is an enlarged view of the B area shown in FIG. 2.

Figure 3:
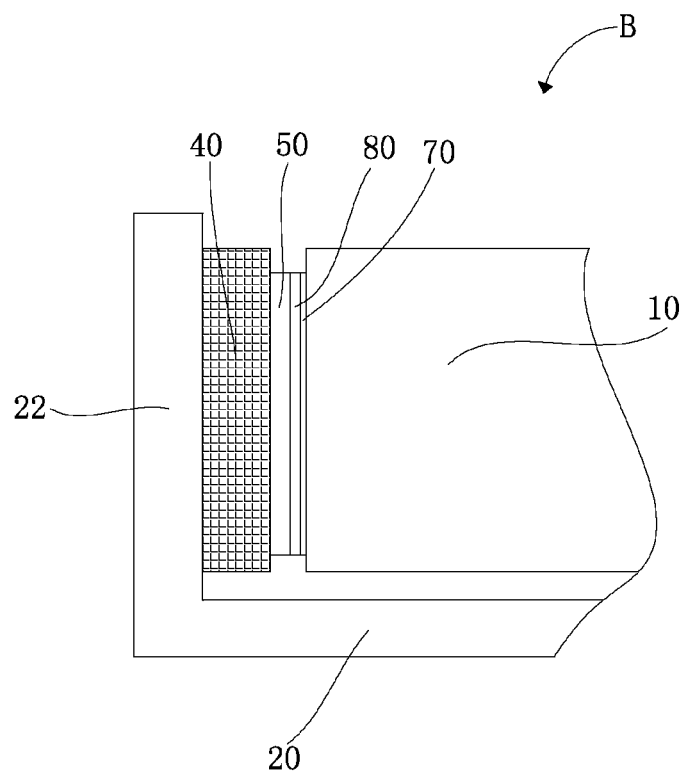
FIG. 3 is an enlarged view of the B area shown in FIG. 2.

Referring to FIG. 1, FIG. 2 and FIG. 3, the positioning structure 100 for LGP and back frame of the present invention comprises an LGP 10, a back frame 20 and a plurality of LEDs 30. Specifically, the back frame 20 is a frame roughly rectangular, with four inner walls 21, 22, 23, 24; for example, a first side inner wall 21 and a fourth side inner wall 24, disposed oppositely to each other; and a second side inner wall 22 and a third side inner wall 23, disposed oppositely to each other. In the instant embodiment, the first side inner wall 21 and the fourth side inner wall 24 are the short sides of the rectangular back frame 20, and the second side inner wall 22 and the third side inner wall 23 are the long sides of the rectangular back frame 20. However, the present invention is not only applicable to rectangular back frame 20. The present invention is also applicable to back frames of other shapes. The four inner walls of the back frame 20 form and define an accommodation space to house the LGP 20 inside the back frame 20. The plurality of LEDs 30 is disposed on the first side inner wall 21. The second side inner wall 22 adjacent to the first side inner wall 21 is disposed with at least a plurality of magnetic bodies 40. A side of the LGP 10 corresponding to the second side inner wall 22 is disposed with a plurality of attachment bodies 50 corresponding to the magnetic bodies 40. The number of the first magnetic bodies 40 is the same as the number of the attachment bodies 50 so as to be correspondingly attached to achieve the positioning and the fixing of the LGP 10 and the back frame 20.

In the instant embodiment, the third side inner wall 23 opposite to the second side inner wall 22 is disposed with a plurality of buffer plates 60. The buffer plates 60 can be made of silicone gel or foam for buffering the force caused by thermal expansion and shrinking of the LGP 10 so as to improve the anti-impact capability of the LGP 10. It should be noted that in the instant embodiment, the second side inner wall 22 and the third side inner wall 23 are interchangeable. In other words, the third side inner wall 23 is disposed with at least a plurality of first magnetic bodies 40, and the second side inner wall 22 opposite to the third side inner wall 23 is disposed with a plurality of buffer plates 60.

In the instant embodiment, for further effect to position and fix the LGP 10 and the back frame 20 more firmly, the fourth side inner wall 24 of the back frame opposite to the first side inner wall 21 can be also disposed with a plurality of second magnetic bodies 41. Correspondingly, a side of the LGP 10 corresponding to the fourth side inner wall 24 is disposed with a plurality of attachment bodies 50 corresponding to the second magnetic bodies 41. The number of the second magnetic bodies 41 is the same as the number of the attachment bodies 50 so as to be correspondingly attached to further enhance the positioning and the fixing of the LGP 10 and the back frame 20. It should be noted that in the instant embodiment, the first side inner wall 21 and the fourth side inner wall 24 are interchangeable. In other words, the first side inner wall 23 is disposed with at least a plurality of second magnetic bodies 41, and the fourth side inner wall 24 is disposed with a plurality of LEDs.

In the instant embodiment, the first magnetic body 40 and the second magnetic body 41 can be samarium cobalt magnets, NdFeB high-performance magnets, or oxidation magnet. The oxide magnet is mainly composed by the metal powder of iron oxide, barium carbonate or strontium carbonate, and is molded into desired shape and size for adhering to the back frame 20. Alternatively, when manufacturing the back frame 20, the first magnetic body 40 and the second magnetic body 41 can be first placed into specific location on the mold. When the back frame 20 is manufactured, the first magnetic body 40 and the second magnetic body 41 will be embedded on the back frame 20.

It is obvious that the first magnetic body 40 and the second magnetic body 41 can also be rubber magnets. The rubber magnets are raw material formed by oxide magnet and rubber mixture, and is easy for manufacturing into various shapes, such as, round, plate or stripe. Then, the rubber magnets can be adhered to the back frame 20 depending on the actual application.

In the instant embodiment, the attachment body 50 is adhered to the side of the LGP 10 by adhesive 70. The adhesive 70 can be transparent acrylic glue. In addition, a surface of the attachment body 50 contacting the adhesive 70 is disposed with a reflective film layer 80. The reflective film layer 80 reflects the light reaching the side of the LGP 10 adhered with attachment 50 back to the LGP 10. The reflective film layer 80 can be silver reflective film layer, gold reflective film layer or media reflective film layer. It is noted that the media reflective film layer should select suitable material for plating depending on the wavelength of the light emitted by LEDs 30. For example, the material for high refractive index film layer in the media reflective film layer can be $TiO_2$, $HfO_2$, $ZrO_2$, and the material for low refractive index film layer can be $SiO_2$, $Al_2O_3$.

The attachment body 50 to in the present instant can be magnetic metal material, such as, galvanized steel sheet or stainless steel. When the LGP 10 is housed inside the back frame 20, the first magnetic body 40 and the second magnetic body 41 disposed on the back frame 20 are attracted by the magnetic force with corresponding attachment body 50 to achieve the effect of positioning and fixing. The magnetic metal material can be magnets or metal material with magnetic attraction to magnets.

It is obvious that the attachment body 50 can also be a magnetic body, in other words, a magnetic body with polarity opposite to the first magnetic body 40 and the second magnetic body 41. For example, the first magnetic body 40 and the second magnetic body 41 are N-type, and the attachment body 50 is S-type. Through magnetic attraction between the first magnetic body 40 and the attachment body 50, the effect of positioning and fixing the LGP 10 and back frame 20 is achieved.

Figure 4:
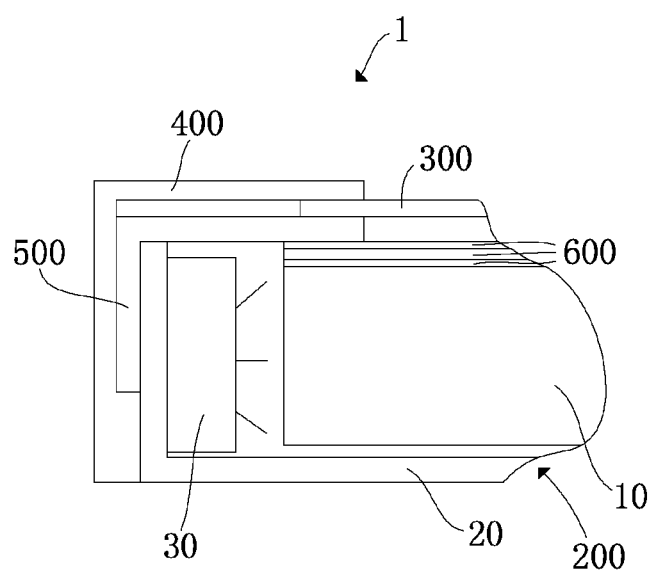
FIG. 4 is a schematic view showing the structure of a liquid crystal display device according to the present invention.

The positioning structure for LGP and back frame is applied to a liquid crystal display device. Specifically, referring to FIG. 4, is a schematic view showing the structure of a liquid crystal display device according to the present invention.

The liquid crystal display device 1 of the instant embodiment comprises a backlight module 200, a display screen 300 and an outer frame 400. Specifically, the backlight module 200 comprises a mold frame 500, at least an optical film 600 and the aforementioned position structure for LGP and back frame, wherein the engagement between the mold frame 500 and the back frame 20 fixes the LGP 10 and LEDs 30 inside the back frame 20, and also fixes the at least an optical film 600 onto the LGP 10. The display screen 300 and the outer frame 400 are disposed in the order on the backlight module 200. The outer frame 400 covers the edge of the display screen 300 and is connected to the back frame 20. As such, the display screen 300 and the backlight module 200 are packaged to form a complete liquid crystal display device.

Through disposing magnetic body on the inner walls of the back frame to attach to the attachment body disposed on corresponding side of the LGP, the positioning structure of the LGP and back frame, the backlight module and the LCD of the present invention can firmly fix the LGP inside the back frame so as to improve the anti-impact capability of the LOP. Through the disposition of the buffer plate to effectively buffer the force caused by the thermal expansion and shrinking of the LGP, the anti-impact capability of the LGP is further enhanced.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the clams of the present invention.

What is claimed is:

1. A positioning structure for light-guiding plate (LGP) and back frame, wherein the LGP being disposed inside the back frame, and a first side inner wall of the back frame being disposed with a plurality of LEDs, a second side inner wall adjacent to the first side inner wall being disposed with at least a first magnetic body, a side of the LGP corresponding to the second side inner wall being disposed with an attachment body corresponding to the first magnetic body; the first magnetic body and the attachment body being correspondingly attached, a third side inner wall of the back frame opposite to the second side inner wall being disposed with at least a buffer plate, a fourth side inner wall of the back frame opposite to the first side inner wall being disposed with at least a second magnetic body, a side of the LGP corresponding to the fourth side inner wall being disposed with an attachment body corresponding to the second magnetic body; the second magnetic body and the attachment body being correspondingly attached.

2. The positioning structure for LGP and back frame as claimed in claim 1, wherein attachment body is a magnetic metal plate.

3. The positioning structure for LGP and back frame as claimed in claim 1, wherein the first magnetic body and the second magnetic body are both magnets.

4. The positioning structure for LGP and back frame as claimed in claim 1, wherein he attachment body is adhered to the side of the LGP by an adhesive, and the adhesive is acrylic glue.

5. The positioning structure for LGP and back frame as claimed in claim 4, wherein a surface of the attachment body contacting the adhesive is disposed with a reflective film layer.

6. The positioning structure for LGP and back frame as claimed in claim 5, wherein the reflective film layer is a silver reflective film layer.

7. A backlight module, which comprises a mold frame, at least an optical film, and a positioning structure for light-guiding plate (LGP) and back frame; wherein in the positioning structure for the LGP and the back frame, the LGP being disposed inside the back frame, and a first side inner wall of the back frame being disposed with a plurality of LEDs, a second side inner wall adjacent to the first side inner wall being disposed with at least a first magnetic body, a side of the LGP corresponding to the second side inner wall being disposed with an attachment body corresponding to the first magnetic body; the first magnetic body and the attachment body being correspondingly attached, a third side inner wall of the back frame opposite to the second side inner wall being disposed with at least a buffer plate, a fourth side inner wall of the back frame opposite to the first side inner wall being disposed with at least a second magnetic body, a side of the LGP corresponding to the fourth side inner wall being disposed with an attachment body corresponding to the second magnetic body; the second magnetic body and the attachment body being correspondingly attached.

8. The backlight module as claimed in claim 7, wherein attachment body is a magnetic metal plate.

9. The backlight module as claimed in claim 7, wherein the first magnetic body and the second magnetic body are both magnets.

10. The backlight module as claimed in claim 7, wherein he attachment body is adhered to the side of the LGP by an adhesive, and the adhesive is acrylic glue.

11. The backlight module as claimed in claim 10, wherein a surface of the attachment body contacting the adhesive is disposed with a reflective film layer.

12. The backlight module as claimed in claim 11, wherein the reflective film layer is a silver reflective film layer.

13. A liquid crystal display device, which comprises a backlight module, a display screen and an outer frame, the backlight module further comprising a mold frame, at least an optical film, and a positioning structure for light-guiding plate (LGP) and back frame; the optical film being disposed on the LGP and being fixed by the mold frame, the display screen being disposed on the mold frame and being fixed by the outer frame; wherein in the positioning structure for the LGP and the back frame, the LGP being disposed inside the back frame, and a first side inner wall of the back frame being disposed with a plurality of LEDs, a second side inner wall adjacent to the first side inner wall being disposed with at least a first magnetic body, a side of the LGP corresponding to the second side inner wall being disposed with an attachment body corresponding to the first magnetic body; the first magnetic body and the attachment body being correspondingly attached, a third side inner wall of the back frame opposite to the second side inner wall being disposed with at least a buffer plate, a fourth side inner wall of the back frame opposite to the first side inner wall being disposed with at least a second magnetic body, a side of the LGP corresponding to the fourth side inner wall being disposed with an attachment body corresponding to the second magnetic body; the second magnetic body and the attachment body being correspondingly attached.

14. The liquid crystal display device as claimed in claim 13, wherein attachment body is a magnetic metal plate.

15. The liquid crystal display device as claimed in claim 13, wherein the first magnetic body and the second magnetic body are both magnets.

16. The liquid crystal display device as claimed in claim 13, wherein he attachment body is adhered to the side of the LGP by an adhesive, and the adhesive is acrylic glue.

17. The liquid crystal display device as claimed in claim 16, wherein a surface of the attachment body contacting the adhesive is disposed with a reflective film layer.

18. The liquid crystal display device as claimed in claim 17, wherein the reflective film layer is a silver reflective film layer.

* * * * *